E. MÜLLER.
APPARATUS FOR AUTOMATICALLY INDICATING THE TIME OF FLIGHT OF A PROJECTILE.
APPLICATION FILED MAR. 22, 1911.
1,079,794.
Patented Nov. 25, 1913.
5 SHEETS—SHEET 1.
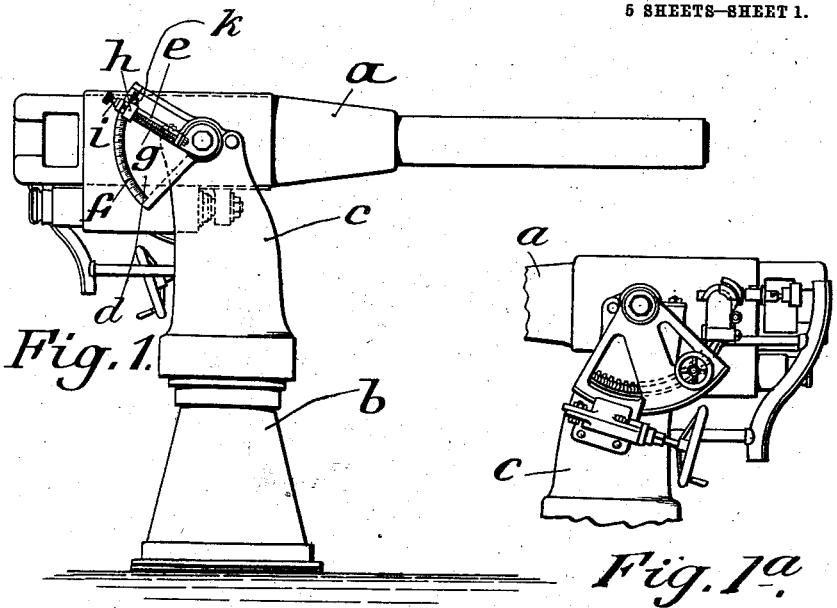
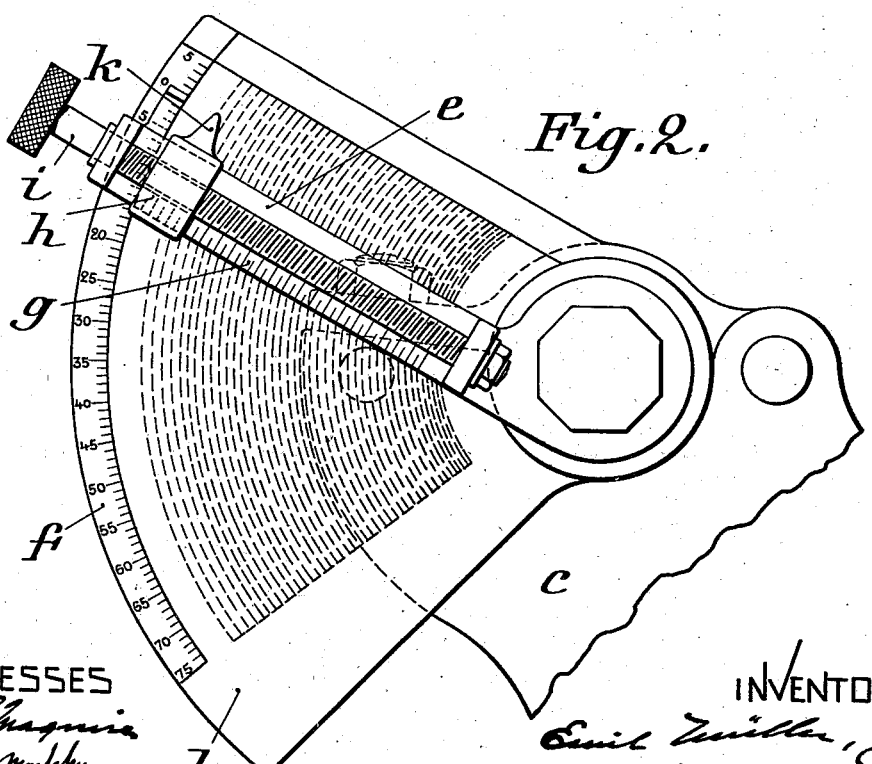

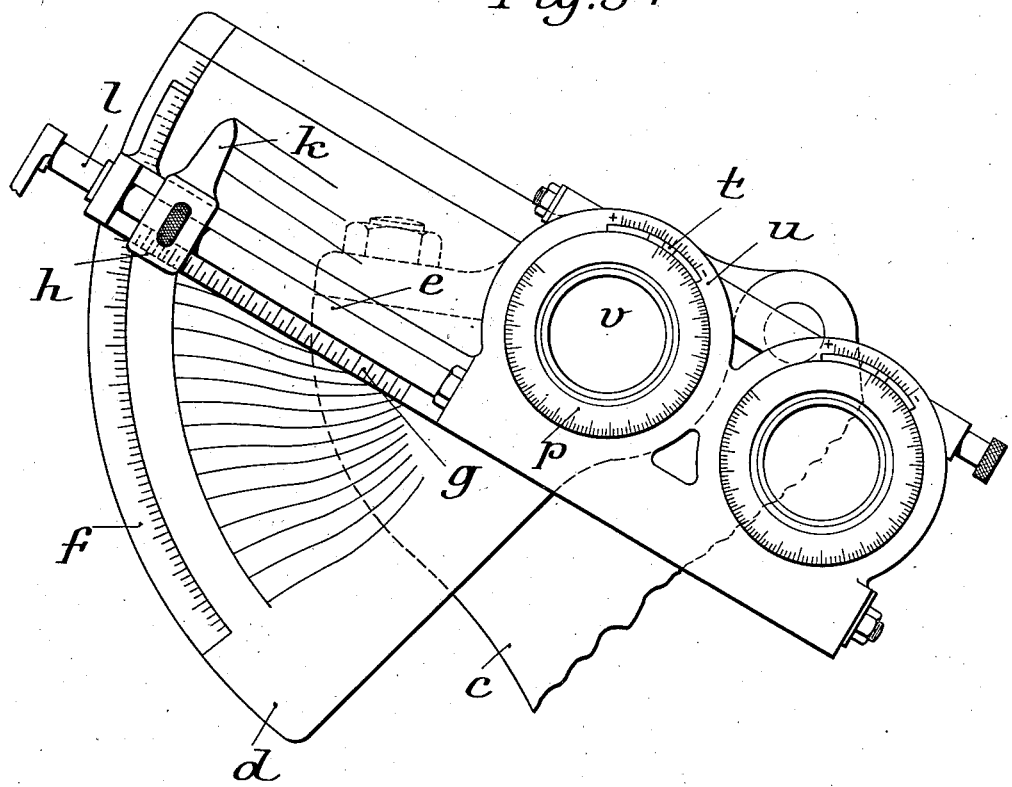
Fig. 3ª

E. MÜLLER.
APPARATUS FOR AUTOMATICALLY INDICATING THE TIME OF FLIGHT OF A PROJECTILE.
APPLICATION FILED MAR. 22, 1911.
1,079,794.
Patented Nov. 25, 1913.
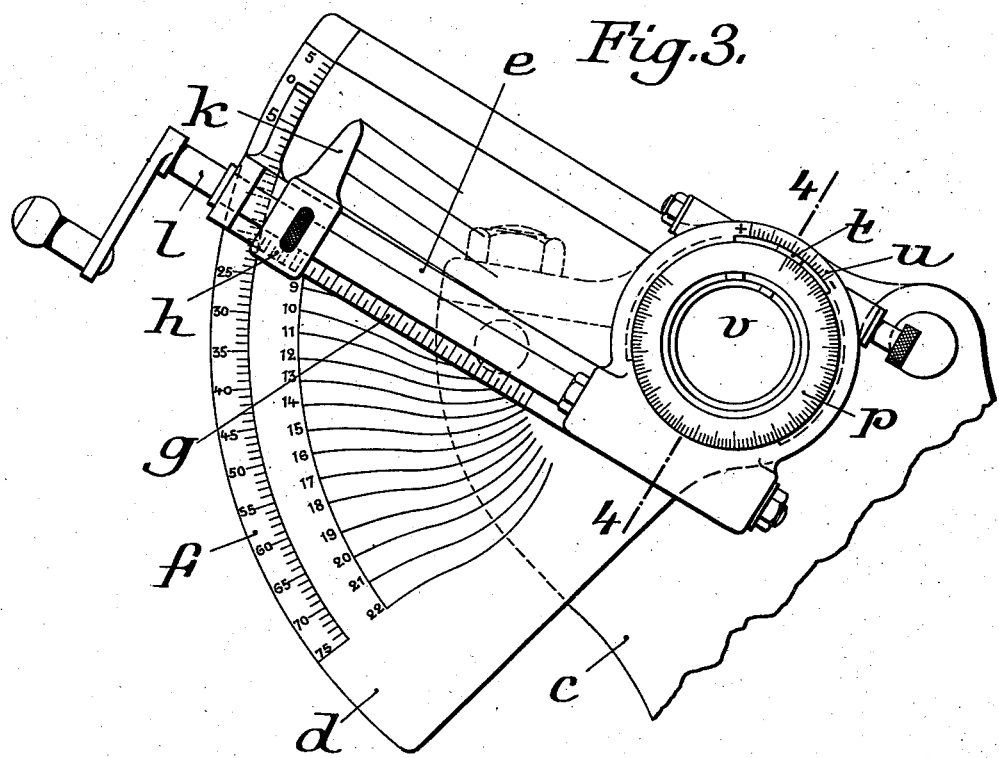
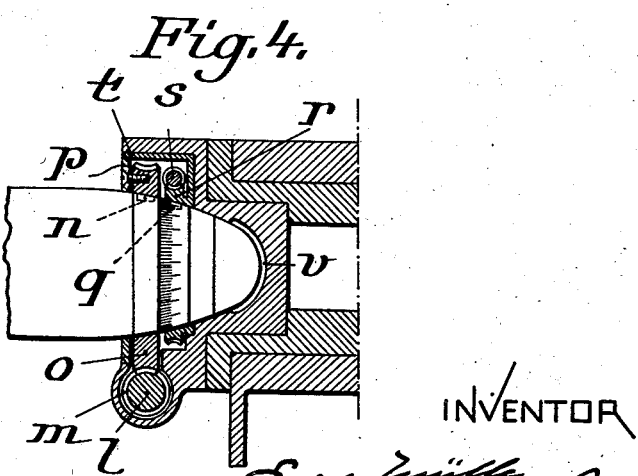

E. MÜLLER.
APPARATUS FOR AUTOMATICALLY INDICATING THE TIME OF FLIGHT OF A PROJECTILE.
APPLICATION FILED MAR. 22, 1911.
1,079,794.
Patented Nov. 25, 1913.
5 SHEETS—SHEET 4.
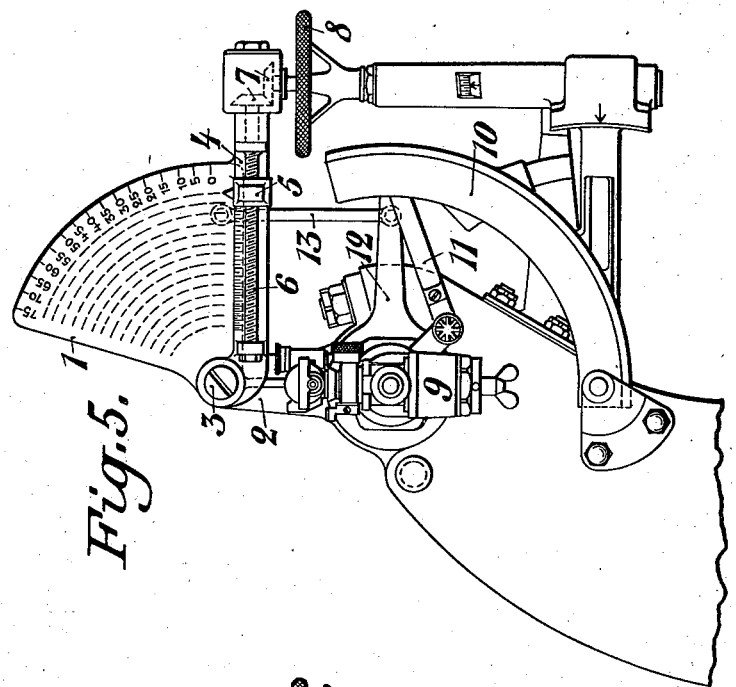
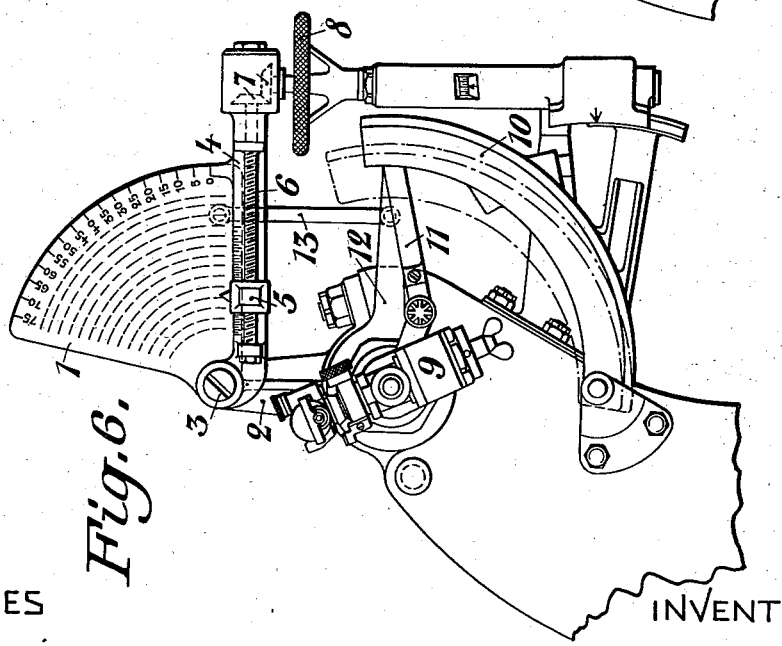

E. MÜLLER.
APPARATUS FOR AUTOMATICALLY INDICATING THE TIME OF FLIGHT OF A PROJECTILE.
APPLICATION FILED MAR. 22, 1911.
1,079,794.
Patented Nov. 25, 1913.
5 SHEETS—SHEET 5.
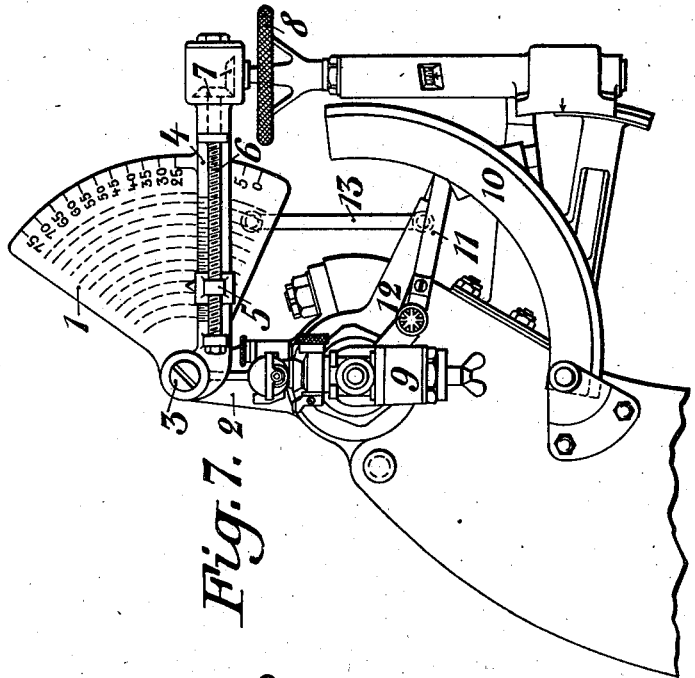
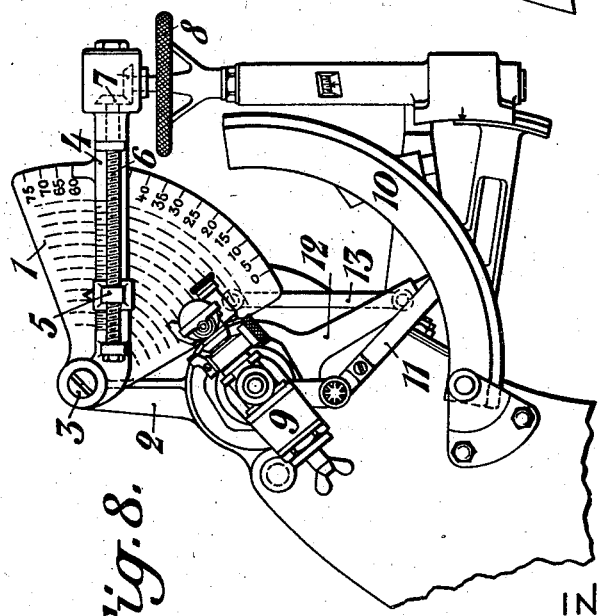
WITNESSES
INVENTOR

UNITED STATES PATENT OFFICE.

EMIL MÜLLER, OF DUSSELDORF, GERMANY, ASSIGNOR TO RHEINISCHE METALL-WAAREN- UND MASCHINENFABRIK, OF DUSSELDORF-DERENDORF, GERMANY, A CORPORATION OF GERMANY.

APPARATUS FOR AUTOMATICALLY INDICATING THE TIME OF FLIGHT OF A PROJECTILE.

1,079,794. Specification of Letters Patent. Patented Nov. 25, 1913.

Application filed March 22, 1911. Serial No. 616,260.

*To all whom it may concern:*

Be it known that I, EMIL MÜLLER, engineer, a subject of the German Emperor, residing at 83 Collenbachstrasse, Dusseldorf, Germany, have invented certain new and useful Improvements in Apparatus for Automatically Indicating the Time of Flight of a Projectile; and I do hereby declare the following to be a full, clear, and exact description of the invention, such as will enable others skilled in the art to which it appertains to make and use the same.

The time of flight of a projectile varies for the same range with the elevation of the target. On this account, especially when firing at highly elevated objects, such as air-ships for example, the time setting of the fuse must be continually changed and must be adjusted with extreme care. Formerly, the time of flight was read off from tables as soon as the range and elevation of the target were determined, and communicated to those concerned in the setting of the fuse. In this indirect manner it might very well happen that the wrong time might be given or other mistakes might occur to prevent the correct timing of the fuse. In order to prevent such mistakes, according to the present invention a device is attached to the gun which automatically indicates the time of flight of the projectile for every elevation likely to occur in practice, when the range has been set, and consequently affords the information required for setting the time of ignition of the fuse. The device can at the same time be applied to a machine for setting the timing of a fuse so that the operator concerned with the setting of the fuse always has the time given by the indicator before his eyes and can always control the action of the time setting machine by a glance.

The device consists essentially of a plate and an arm which move relatively to each other according to the elevation of the gun. An adjustable indicator is attached to the arm, which can be set on the division which corresponds to the range. The different times of flight or the corresponding times of ignition of the fuse are marked on the plate either in numerals or graphically, so that the indicator points automatically, as the gun is elevated, to the time of flight corresponding to this elevation and the range set.

The invention will be hereinafter fully set forth and particularly pointed out in the claims.

In the accompanying drawings, Figure 1 is a view in side elevation of a gun equipped with a simple form of my present improvement. Fig. 1ᵃ is a fragmentary view of the opposite side of the gun from that shown in Fig. 1. Fig. 2 is an enlarged view with parts omitted and others broken away. Fig. 3 is an enlarged side elevation showing a different arrangement of flight or ignition scale; and also showing means for setting the timing rings of a fuse. Fig. 3ᵃ is a similar view showing an additional fuse timing ring. Fig. 4 is a section on line 4—4, Fig. 3. Figs. 5 and 6 are side elevations showing the invention employed in connection with means for automatically adjusting the parts in positioning the gun. Figs. 7 and 8 show the same parts in different positions, Fig. 7 indicating the parts as they are after the gun has been elevated and the target is in the horizontal plane through the axis of the gun; while in Fig. 8 the parts are shown in position when the gun has been raised to fire at an elevated object.

In Figs. 1 and 2 the gun $a$ swings in a vertical plane by means of trunnions in the carriage. A sector shaped plate $d$ is fixed to the upper part $c$ of the carriage. An arm $e$ is fastened to one of the trunnions, so as to turn therewith. The plate $d$ has a scale $f$ of degrees of elevation engraved at its outer edge. A mark on the arm $e$ shows the elevation of the gun since the arm turns with the gun about the axis of the trunnions. The arm $e$ carries in the direction of its length a scale of ranges $g$. A sliding block $h$ carrying a pointer $k$ can be set to any required range by turning a spindle $i$ attached to the arm. The time setting of the fuse or the flight of the projectile is laid off on the plate in a series of curves concentric to the axis of the trunnions which are numbered for every elevation of the gun and given range. In the drawings these numbers are not shown. When the sliding block $h$ has been set to the required range, the pointer $k$ shows the time of flight and time setting of the fuse for any elevation given to the gun.

In the arrangements illustrated in Figs. 3 and 4 the indicating device is combined with a fuse time setting machine. Similar parts are described by the same reference letters as before. The principal difference between the indicating device of Fig. 2 and of Fig. 3 is that the times of ignition or flight are shown in the latter case in curves which each correspond to a definite time. The sliding block is not moved by the spindle but set by hand in Fig. 3.

Fig. 4 is a sectional view through the line 4—4 of Fig. 3. The spindle $l$ connected to the arm $e$ serves for the adjustment of the fuse time setting machine, which is situated in the hollow trunnion $v$ of the gun and is constructed in the usual way. A worm $m$ on the spindle $l$ can turn a worm wheel $o$ on which is the setting nose $n$. The disk $p$ carrying a scale showing the times of ignition, is connected with the worm wheel $o$. A second worm wheel $r$ carries the second nose $q$ required for the setting of the charging ring and can be turned by the worm $s$. This setting device serves to correct the times of flight. A mark $t$ on the worm wheel $r$ allows a setting to be made to the division $u$ on the circumference of the time setting machine. Several fuse time setting machines can be connected to the same indicating device, one of the machines being suitably disposed in the trunnions. For instance, in Fig. 3ª I have shown a second casing for inserting a fuse, the shaft $l$ and worm $m$ (Fig. 4) being elongated. The shaft and worm for adjusting the correction of the time of flight are likewise lengthened so as to act on both timing rings. The arm $e$ may be fixed and the sector shaped plate $d$ swung with the gun. Or again the arrangement may be modified so that neither the arm $e$ nor the plate $d$ rotates with the gun around the trunnions, but the movement of the gun is transmitted to the plate or to the arm by suitable gearing.

Figs. 5 to 8 illustrate a form of the invention in which when the range is set on the sighting apparatus the same movement sets the pointer on the fuse time scale, so that a single mechanism suffices for both settings. In these figures an aiming device is illustrated in which the range angle is automatically altered according to the elevation. This does not form part of my present invention, being included in an application Serial No. 608,915, filed February 16, 1911.

As may be seen from the Figs. 5 to 8, the fuse time scale plate 1 does not turn about the trunnions, but about a pivot 3 in an upper extension 2 of the sides of the carriage. The arm 4 carrying the pointer 5 is secured to the extension 2. The pointer is displaced by a screw spindle 6, which is turned by beveled wheels 7 by means of the hand wheel 8. The hand wheel also serves at the same time for setting the range at the sighting apparatus and is connected in the accompanying figure, which is shown by way of example, with the aiming device 9 through a gearing, which is described in the before noted application, and in which the range angle is automatically altered by an arc 10 through the link 11, whenever the gun is pointed at an elevated target. Since these devices do not form the subject of the present application, they need not be further described. The arm 12 of the sighting device fits over the hexagon shaped trunnion and is connected to the time fuse plate 1 by the pivoted rod 13, so that the plate 1, the carriage extension 2, the arm 12 and the rod 13 form a linked parallelogram. If the sighting device is adjusted to a certain setting by rotating the hand wheel 8, the beveled gearing 7 also moves the indicator 5 along the time fuse scale into the position corresponding to the range set. Fig. 6 shows this disposition of the parts. If the gun is elevated, the sighting device is brought by means of the arm 12 into the position shown in Fig. 7, in which it is assumed that the target is on the horizontal plane through the axis of the gun. At the same time the arm 12 pulls the fuse time scale plate 1 downward by means of the rod 13, the scale plate turning on its pivot 3. The indicator 5 now shows the time of flight of the projectile for the given range. If an elevated object is to be aimed at, the gun must be raised so that the arm 12 arrives at the position shown in Fig. 8 and takes the sighting device with it, so that the range angle previously set is altered by means of the link 11 by an amount determined by the form and position of the arc 10. This disposition of the parts is shown in Fig. 8, where it will be noticed that the indicator 5 is set to a different time of flight.

Having now particularly described and ascertained the nature of my said invention and in what manner the same is to be performed, I declare that what I claim is:

1. In combination with a gun, means for indicating the range, and means for indicating the time of flight of a projectile, one of said means being adjusted relatively to the other in adjusting the position of the gun.

2. In combination with a gun, means for indicating the range, and means for indicating the time of flight of a projectile, one of said means being automatically adjusted relatively to the other in adjusting the position of the gun.

3. In combination with a gun, means for changing the elevation of the gun, means for indicating the range, and means for indicating the time of flight of a projectile according to the different elevations of the gun.

4. In combination with a gun, means for changing the elevation of the gun, a sighting device, means for indicating the range, means for changing the position of the sighting device, means for indicating the time of flight of a projectile, and means for simultaneously adjusting the sighting device and the range indicating means.

5. In combination with a gun, means for changing the elevation of the gun, means for indicating the range, means for indicating the time of flight of a projectile, and means for automatically changing the flight indicating means in changing the position of the gun.

6. In combination with a gun, means for changing the elevation of the gun, means for indicating the range, means for indicating the time of flight of a projectile, a sighting device, means for automatically changing the flight indicating means in changing the position of the gun, and means for simultaneously adjusting the sighting device and the range indicating means.

7. In combination with a gun, a plate having an elevation-angle scale and a scale indicating the time of flight of a projectile, an arm extending over said plate and having a range scale, a pointer adjustable on said arm and extending over said flight indicating scale, and means for effecting a relative adjustment between the plate and the arm.

8. In combination with a gun, a plate having an elevation-angle scale and a scale indicating the time of flight of a projectile, an arm extending over said plate and having a range scale, a pointer adjustable on said arm and extending over said flight indicating scale, said arm being mounted concentrically to said plate and movable thereover in changing the elevation of the gun.

In testimony whereof, I have signed this specification in the presence of two subscribing witnesses.

EMIL MÜLLER.

Witnesses:
   CHAS. BORNGRAEBER,
   AUGUST MÜLLER.